US012312518B2

(12) United States Patent
Coertjens et al.

(10) Patent No.: US 12,312,518 B2
(45) Date of Patent: May 27, 2025

(54) ADHESIVE WITH HIGH FILLER CONTENT

(71) Applicant: Avery Dennison Corporation, Mentor, OH (US)

(72) Inventors: Stijn Coertjens, Mechelen (BE); Celine E. J. Huyskens, Turnout (BE); Ingrid E. Geuens, Ranst (BE)

(73) Assignee: Avery Dennison Corporation, Mentor, OH (US)

( * ) Notice: Subject to any disclaimer, the term of this patent is extended or adjusted under 35 U.S.C. 154(b) by 342 days.

(21) Appl. No.: 17/312,234

(22) PCT Filed: Dec. 19, 2019

(86) PCT No.: PCT/US2019/067353
§ 371 (c)(1),
(2) Date: Jun. 9, 2021

(87) PCT Pub. No.: WO2020/132176
PCT Pub. Date: Jun. 25, 2020

(65) Prior Publication Data
US 2022/0025224 A1      Jan. 27, 2022

Related U.S. Application Data

(60) Provisional application No. 62/783,095, filed on Dec. 20, 2018.

(51) Int. Cl.
| | | |
|---|---|---|
| C09J 7/29 | (2018.01) | |
| C09J 7/21 | (2018.01) | |
| C09J 7/22 | (2018.01) | |
| C09J 7/28 | (2018.01) | |
| C09J 7/38 | (2018.01) | |
| C09J 7/40 | (2018.01) | |

(52) U.S. Cl.
CPC ............... *C09J 7/387* (2018.01); *C09J 7/21* (2018.01); *C09J 7/22* (2018.01); *C09J 7/28* (2018.01); *C09J 7/29* (2018.01); *C09J 7/40* (2018.01); *C09J 2301/408* (2020.08); *C09J 2400/163* (2013.01); *C09J 2400/226* (2013.01); *C09J 2400/263* (2013.01); *C09J 2467/006* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 4,007,311 A * | 2/1977 | Harlan, Jr. | ............ C09J 111/00 428/463 |
| 5,851,663 A | 12/1998 | Parsons et al. | |
| 6,022,914 A | 2/2000 | Nowak et al. | |
| 6,114,426 A | 9/2000 | Burack et al. | |
| 6,169,139 B1 | 1/2001 | Petit et al. | |
| 6,284,368 B2 | 9/2001 | Muta et al. | |
| 6,288,147 B1 | 9/2001 | Vonken et al. | |
| 6,428,887 B1 | 8/2002 | Vargo et al. | |
| 6,586,483 B2 | 7/2003 | Kolb et al. | |
| 6,607,827 B2 | 8/2003 | Hanai | |
| 6,624,273 B1 | 9/2003 | Everaerts et al. | |
| 6,893,583 B2 | 5/2005 | Sakurai et al. | |
| 6,989,192 B2 | 1/2006 | Husemann et al. | |
| 7,109,266 B2 | 9/2006 | Ishiguro et al. | |
| 7,326,462 B2 | 2/2008 | Ishiguro et al. | |
| 7,452,923 B2 | 11/2008 | Jeon et al. | |
| 7,501,169 B2 | 3/2009 | Lavature et al. | |
| 7,524,394 B2 | 4/2009 | Nakanishi et al. | |
| 7,527,753 B2 | 5/2009 | Hiroshige et al. | |
| 7,576,156 B2 | 8/2009 | Ishiguro et al. | |
| 7,645,514 B2 | 1/2010 | Watanabe et al. | |
| 7,645,827 B2 | 1/2010 | Lewandowski et al. | |
| 7,704,602 B2 | 4/2010 | Wang et al. | |
| 7,744,991 B2 | 6/2010 | Fischer et al. | |
| 7,820,740 B2 | 10/2010 | Kondo et al. | |
| 8,071,490 B2 | 12/2011 | Ko et al. | |
| 8,105,689 B2 | 1/2012 | Craciun et al. | |
| 8,518,303 B2 | 8/2013 | Katogi et al. | |
| 9,012,549 B2 | 4/2015 | Tanaka et al. | |
| 9,540,550 B2 | 1/2017 | Wu et al. | |
| 9,550,925 B2 | 1/2017 | Kim et al. | |
| 9,732,260 B2 | 8/2017 | Yamada et al. | |
| 9,752,058 B2 | 9/2017 | Sato et al. | |
| 2004/0126574 A1 | 7/2004 | Kawagushi et al. | |
| 2004/0234753 A1 | 11/2004 | Husemann et al. | |

(Continued)

FOREIGN PATENT DOCUMENTS

| | | |
|---|---|---|
| CN | 102037091 | 4/2011 |
| CN | 103003321 | 3/2013 |

(Continued)

OTHER PUBLICATIONS

Park et al., "Preparation and flame retardancy of 2-EHA/n-BA acrylic PSA containing single and combined flame retardants," Journal of Applied Polymer Science, vol. 117, pp. 3092-3097, 2010.

(Continued)

*Primary Examiner* — Anish P Desai

(57) ABSTRACT

Provided herein are adhesive compositions comprising a controlled architecture polymer network acrylic copolymer, a crosslinker, and at least two fillers. These adhesive compositions can exhibit strong adhesion performance at high filler concentrations. Also provided are adhesive tapes and methods using the disclosed adhesive composition.

22 Claims, No Drawings

(56) References Cited

U.S. PATENT DOCUMENTS

| | | |
|---|---|---|
| 2005/0059754 A1 | 3/2005 | Lunt et al. |
| 2005/0192392 A1 | 9/2005 | Kim et al. |
| 2005/0227065 A1 | 10/2005 | Nishimura et al. |
| 2006/0135674 A1 | 6/2006 | Ishiguro et al. |
| 2006/0142412 A1 | 6/2006 | Yamaoka et al. |
| 2007/0059521 A1 | 3/2007 | Nakamura |
| 2007/0169885 A1 | 7/2007 | Mikuni et al. |
| 2007/0231571 A1 | 10/2007 | Lane et al. |
| 2008/0241529 A1 | 10/2008 | Bauer et al. |
| 2009/0004493 A1 | 1/2009 | Maier et al. |
| 2009/0104444 A1 | 4/2009 | Garcia-Ramirez et al. |
| 2009/0142593 A1 | 6/2009 | Okochi et al. |
| 2009/0291291 A1 | 11/2009 | Epple et al. |
| 2010/0233926 A1 | 9/2010 | Shin et al. |
| 2011/0031435 A1 | 2/2011 | Yoda et al. |
| 2011/0118372 A1 | 5/2011 | Lester et al. |
| 2011/0217542 A1 | 9/2011 | Moroishi et al. |
| 2011/0290468 A1 | 12/2011 | Nakayama et al. |
| 2012/0015100 A1 | 1/2012 | Okochi et al. |
| 2012/0088102 A1 | 4/2012 | Su et al. |
| 2013/0052457 A1 | 2/2013 | Inui et al. |
| 2013/0059971 A1 | 3/2013 | Miller et al. |
| 2013/0236718 A1 | 9/2013 | Buettner et al. |
| 2013/0309487 A1 | 11/2013 | Sugino et al. |
| 2014/0004342 A1 | 1/2014 | Tojo et al. |
| 2014/0037924 A1 | 2/2014 | Furuta et al. |
| 2014/0107282 A1 | 4/2014 | Tran et al. |
| 2014/0135417 A1 | 5/2014 | Sugino et al. |
| 2014/0145140 A1 | 5/2014 | Kim |
| 2014/0162058 A1 | 6/2014 | Tran et al. |
| 2014/0162059 A1* | 6/2014 | Wan ................... C09J 133/00 428/355 AC |
| 2015/0037575 A1* | 2/2015 | Sakaguchi ........... C09D 133/00 156/60 |
| 2015/0132567 A1 | 5/2015 | Shimokuri et al. |
| 2015/0210903 A1 | 7/2015 | Kim et al. |
| 2015/0275050 A1 | 10/2015 | Wei-Cheng et al. |
| 2015/0337176 A1 | 11/2015 | Tran et al. |
| 2016/0083628 A1 | 3/2016 | Helmink et al. |
| 2016/0215182 A1 | 7/2016 | Takahashi et al. |
| 2016/0289516 A1 | 10/2016 | Makihata et al. |
| 2016/0312092 A1 | 10/2016 | Yamada et al. |
| 2016/0333233 A1 | 11/2016 | Melnikova et al. |
| 2017/0015874 A1 | 1/2017 | Kluge-Paletta et al. |
| 2017/0174954 A1 | 6/2017 | Ross et al. |
| 2017/0174955 A1 | 6/2017 | Mammarella et al. |
| 2017/0306187 A1 | 10/2017 | Bohm et al. |
| 2018/0022967 A1 | 1/2018 | Pyun et al. |
| 2018/0022976 A1 | 1/2018 | Du et al. |
| 2018/0044564 A1 | 2/2018 | Pyun et al. |
| 2018/0112021 A1 | 4/2018 | Bartholomew et al. |

FOREIGN PATENT DOCUMENTS

| | | |
|---|---|---|
| CN | 103998481 | 8/2014 |
| CN | 104220542 | 12/2014 |
| EP | 1097978 | 5/2001 |
| EP | 1637571 | 3/2006 |
| EP | 2065455 | 6/2009 |
| EP | 2383321 | 11/2011 |
| EP | 3064560 | 5/2022 |
| JP | 9-221639 | 8/1997 |
| WO | 98/01478 | 1/1998 |
| WO | 99/05099 | 2/1999 |
| WO | 99/31144 | 9/1999 |
| WO | 2005/017060 | 2/2005 |
| WO | 2007/049652 | 5/2007 |
| WO | 2007/116686 | 10/2007 |
| WO | 2009/006168 | 1/2009 |
| WO | 2009/117654 | 9/2009 |
| WO | 2009/157315 | 12/2009 |
| WO | 2011/111534 | 9/2011 |
| WO | 2011/146450 | 11/2011 |
| WO | 2012/046710 | 4/2012 |
| WO | 2013/055978 | 4/2013 |
| WO | 2013/061830 | 5/2013 |
| WO | 2013/088949 | 6/2013 |
| WO | 2013/115338 | 8/2013 |
| WO | 2013/126377 | 8/2013 |
| WO | 2013/183389 | 12/2013 |
| WO | 2014/069178 | 5/2014 |
| WO | 2014/069461 | 5/2014 |
| WO | 2014/069462 | 5/2014 |
| WO | 2014/118878 | 8/2014 |
| WO | 2014/118927 | 8/2014 |
| WO | 2014/121341 | 8/2014 |
| WO | 2016/044013 | 3/2016 |
| WO | 2016/122145 | 8/2016 |
| WO | 2016/141001 | 9/2016 |
| WO | 2016/158760 | 10/2016 |
| WO | 2017/043683 | 3/2017 |
| WO | 2017/063170 | 4/2017 |
| WO | 2017/127239 | 7/2017 |
| WO | 2017/183515 | 12/2017 |
| WO | 2017/221885 | 12/2017 |

OTHER PUBLICATIONS

International Preliminary Report on Patentability dated Jun. 16, 2021 issued in corresponding IA No. PCT/US2019/067353 filed Dec. 19, 2019.

International Search Report and Written Opinion dated Apr. 28, 2020 issued in corresponding IA No. PCT/US2019/067353 filed Dec. 19, 2019.

* cited by examiner

ADHESIVE WITH HIGH FILLER CONTENT

CROSS-REFERENCE TO RELATED APPLICATIONS

The present application is a 371 of international Application No. PCT/US2019/067353, which was published in English on Jun. 25, 2020, and claims the benefit of U.S. Provisional Patent Application No. 62/783,095 filed Dec. 20, 2018, both of which are incorporated herein by reference in their entireties.

FIELD

The present disclosure relates generally to acrylic polymer compositions having improved adhesive performance at high filler concentration

BACKGROUND

It is known in the art that tapes can be constructed having one or more layers of pressure sensitive adhesives layers that include an acrylic based polymer. These acrylic tapes generally exhibit good adhesion when applied to high surface energy materials such as aluminum or steel. In addition to these adhesion properties, tapes using acrylic polymers can also be characterized by their high resistance to shear forces, chemical degradation, and extreme, e.g., elevated or reduced, temperatures. The ability of acrylic tapes to provide a lightweight and easily applied means for effectively bonding surfaces and damping vibrations allows these tapes to find use in a variety of different applications.

Acrylic pressure sensitive adhesives often, however, have a high flammability due to their inherent organic polymer structure. It is increasingly common for applications in which tapes are used to require components that meet maximal flammability level requirements. This is particularly the case when tapes are elements of the construction of buildings, vehicles, or other products for which occupant or operator safety must be maintained. As flame resistance restrictions become more stringent, the flammability of acrylic tapes begins to counter or outweigh the benefits that these adhesive products offer.

One approach that has been employed to decrease the flammability of acrylic adhesives is the inclusion of halogenated fillers. These halogenated materials can be effective at even low concentrations for increasing the flame resistance of acrylic polymers, and allowing them to meet most flammability requirements. However, environmental concerns and regulations prevent the use of halogenated fillers in many instances. For example, certain regulations may not permit the use of halogenated materials, including use in the construction of motorized vehicles. Further, the use of halogenated materials may not be desired.

As this trend towards limiting halogen use continues and spreads to other applications, non-halogenated filler materials are becoming increasingly important for providing acrylic pressure sensitive adhesive flame resistance. However, in order to achieve a similar acrylic polymer flammability reduction to what can be gained with a halogenated filler, a much higher concentration of non-halogenated filler must be applied. Because these fillers generally do not possess inherent tackiness, they negatively impact the adhesion properties of acrylic polymer compositions to which they are added, decreasing adhesion as more filler is added. As a result, a need remains for acrylic adhesive compositions that maintain high adhesion performance at high levels of filler, e.g., non-halogenated filler, content.

SUMMARY

In one embodiment, the disclosure is to an adhesive composition comprising an acrylic copolymer, a crosslinker, and at least two fillers. The acrylic copolymer includes a first block and a second block, each independently having a crosslinkable functional group. In many embodiments, the first block is chemically different from the second block. In many embodiments, the first block is structurally different from the second block. The crosslinker is reactive with the crosslinkable functional groups of the first and second blocks. The acrylic copolymer has a controlled architecture polymer (CAP) network. Preferably, the concentration of the crosslinker in the adhesive composition ranges from 0.01 wt % to 2.0 wt %. Preferably, the combined concentration of the at least two fillers in the adhesive composition ranges from 0.5 wt % to 50 wt %. In many embodiments, the combined concentration of the at least two fillers in the adhesive composition ranges from 1 wt % to 45 wt %. In some embodiments, the combined concentration of the at least two fillers in the adhesive composition ranges from 1 wt % to 10 wt %. Preferably, the adhesive composition has a peel adhesion greater than 15 N/inch.

In another embodiment the disclosure relates to a method of preparing an adhesive composition. The method includes providing the adhesive composition described herein wherein the acrylic copolymer has a controlled architecture polymer network. The method includes providing an acrylic copolymer, a crosslinker, and at least two fillers. The acrylic copolymer includes a first block and a second block, each independently having a crosslinkable functional groups of the first and second blocks. The crosslinker is reactive with the crosslinkable functional groups. The acrylic copolymer has a CAP network. The method further includes combining the acrylic copolymer, the crosslinker, and the at least two fillers to form the adhesive composition. Preferably, the combined concentration of the at least two fillers in the adhesive composition is greater than 15 wt %. In some embodiments, the at least two fillers include a first filler and a second filler, and the mass ratio of the first filler to the second filler ranges from 1 to 99.

In another embodiment, the disclosure relates to a tape that includes at least one adhesive layer having an adhesive composition as disclosed herein. Preferably, each of the at least one adhesive layers independently has a thickness ranging from 10 μm to 300 μm. In certain aspects, the tape further includes a backing layer joined to one of the at least one adhesive layers. In some embodiments, the backing layer has a thickness ranging from 5 μm to 10 mm.

In another embodiment, the disclosure relates to a method of applying a tape to a surface. The method includes providing a surface having an outer face. The method further includes providing a tape as disclosed herein. The method further includes adhering the adhesive layer of the tape to the outer face of the surface, thereby applying the tape to the surface.

In another embodiment, the disclosure relates to a taped surface. The taped surface includes a surface having an outer face. The taped surface further includes a tape as disclosed herein adhered to the outer face of the surface.

In another embodiment, the disclosure relates to a fire retardant. In certain aspects, the fire retardant includes an adhesive composition as disclosed herein. In some aspects, the fire retardant includes a tape as disclosed herein.

DETAILED DESCRIPTION

The present disclosure generally relates to acrylic adhesive compositions that, when used for example in a tape construction, are advantageously capable of exhibiting high adhesion while including a high filler concentration. For example, it is beneficial for an acrylic adhesive both to have strong adhesion performance and to include fillers as a means for decreasing the flammability of the adhesive. This combination of characteristics can allow the adhesive to be useful in applications requiring tapes having strong bonding as well as high flame retardancy.

Conventionally, fire resistance has been incorporated into such adhesive tapes through the use of specialized carriers, flame retardant monomers, or halogenated or nanometer-scale fillers. Each of these conventional techniques, however, can suffer from significant drawbacks and limitations.

One approach for improving the fire resistance of an acrylic tape is to construct the tape in a configuration that includes a carrier layer having enhanced flame retardancy properties. If the selected carrier layer is capable of acting as a significant enough flame retardant, then the composition of the adhesive layer of the tape can be more freely chosen, as all required fire resistance characteristics of the tape are derived solely from the carrier layer. While this design configuration does therefore impart greater flexibility in formulating a tape adhesive in some circumstances, there are certain applications for which the use of a carrier layer is not appropriate. In particular, widely used transfer tape products consist of one or more adhesive layers and disposable backing layers, and do not include a carrier layer.

Another approach for improving acrylic tape fire resistance involves the use of flame retardant monomers during formation of the acrylic polymer of the adhesive. These flame retardant monomers can include, for example, phosphor- or nitrogen-based monomers. The incorporation of these monomers into the backbone of the acrylic polymer can, though, significantly increase the cost and complexity of the polymerization process. In addition, there is a limit to the number of such monomers that can be added to the polymer without adversely impacting adhesive performance. As a result, the synthesis of an acrylic polymer produced in this way is often configured to balance the adhesive and flame retardancy properties of the final acrylic adhesive product. Any change in the demands for one or both of these properties then necessitates a further costly redesign of the polymerization process.

The addition of fillers, and in particular, halogenated fillers, to the acrylic polymer compositions is another well-known approach for improving acrylic adhesive flame resistance. These halogenated fillers, however, are increasingly recognized as environmental contaminants that can have toxic biological effects and high persistency. Furthermore, it has been widely observed that the addition of fillers in general to adhesives typically causes the adhesion performance, e.g., the peel adhesion, of the adhesive to drop with increasing filler concentration. A known strategy for partially mitigating this decreasing performance involves the use of nanometer-scale, e.g., up to 20-nm-scale, particles as a filler. Particles of such controlled and limited size are, though, much more expensive than more widely available micron-sized particles having a broad particle size distribution. Additionally, such nanometer-scale particles may be subject to certain safety and/or health concerns as they are added into a formulation.

The inventors have now discovered that compositions including certain combinations of two or more fillers, a crosslinker, and an acrylic copolymer having a controlled architecture polymer (CAP) network can surprisingly exhibit strong adhesive properties despite having high filler concentrations. For this CAP network, more functional or non-functional fillers may be packed into an adhesive layer for a lower impact on adhesion. In some instances, combining these fillers may provide improved adhesion over formulations without any filler.

For example, adhesive compositions disclosed herein can have a combined filler concentration greater than 25 wt % together with a peel adhesion greater than 20 N/inch, or a combined filler concentration greater than 35 wt % together with a peel adhesion greater than 15 N/inch. These and other strong adhesion characteristics are not present if the overall filler content of the adhesive compositions includes only one of the two or more fillers, but can surprisingly be achieved when the two or more fillers are combined together in the composition.

Importantly, the provided adhesive compositions do not require fillers having sizes less than 20 nm, allowing more commonly available filler geometries to be used. The adhesive compositions also advantageously do not require acrylic copolymers having specialized monomer components, e.g., nitrogen- or phosphorous-containing monomers. Another benefit of the adhesive compositions is that they can be used in tapes, e.g., fire resistant tapes, that are not limited to certain configurations. When used in a fire resistant or flame retardant tape, the disclosed adhesive composition allows tapes to have higher flame retardancy at a given peel adhesion than was possible using conventional non-halogenated approaches. Consequently, the disclosed adhesive compositions can be effectively used for certain applications for which only more expensive and less environmentally friendly halogenated flame retardants were previously suitable.

In one embodiment, an adhesive composition is disclosed. The adhesive composition includes an acrylic copolymer, a crosslinker, and two or more fillers. As used herein, the term "filler" refers to an adhesive composition additive that is not classified as a resin and does not possess inherent tackiness. The acrylic copolymer has a controlled architecture polymer (CAP) network that includes a first block and a second block. The first and second block of the acrylic copolymer may be different from one another, and each includes a crosslinkable functional group. The crosslinker of the adhesive composition is reactive with the crosslinkable functional groups of the first and second acrylic copolymer blocks.

Fillers

The adhesive compositions disclosed herein include two or more fillers. The number of different types of fillers present in the adhesive composition can be, for example, two, three, four, five, six, seven, eight, nine, or ten or more. In certain aspects, the number of fillers in the adhesive composition is two, e.g., the adhesive composition has only a first filler and a different second filler.

The overall concentration of filler in the adhesive composition can be selected to be high enough to provide a desired characteristic, e.g., flame retardancy, while still allowing the composition to exhibit strong adhesion performance, e.g., peel adhesion. The particular compositions disclosed herein can have much higher filler concentrations that those of conventional adhesive compositions without negatively impacting adhesion. The combined concentration of the at least two fillers in the composition can, for example, range from 0.5 wt % to 50 wt %, e.g., from 1 wt % to 45 wt %, from 2 wt % to 30.8 wt %, from 6.8 wt % to 35.6 wt %, from 11.6 wt % to 40.4 wt %, from 16.4 wt % to 45.2 wt %, or from 21.2 wt % to 50 wt %. In one embodiment, the concentration of at least two fillers range from 1 wt % to 10 wt %. The combined concentration of the fillers can range from 5 wt % to 45 wt %, e.g., from 5 wt % to 26 wt %, from 8.5 wt % to 29.5 wt %, from 12 wt % to 33 wt %, from 15.5 wt % to 36.5 wt %, or from 19 wt % to 40 wt %. The combined concentration of the fillers can range from 5 wt % to 25 wt %, e.g., from 5 wt % to 17 wt %, from 7 wt % to 19 wt %, from 9 wt % to 21 wt %, from 11 wt % to 23 wt %, or from 13 wt % to 25 wt %. The combined concentration of the fillers can range from 20 wt % to 40 wt %, e.g., from 20 wt % to 32 wt %, from 22 wt % to 34 wt %, from 24 wt % to 36 wt %, from 26 wt % to 38 wt % or from 28 wt % to 40 wt %. In one embodiment, the combined concentration of the fillers ranges from 1 wt % to 10 wt %. In terms of upper limits, the filler concentration can be less than 50 wt %, e.g., less than 45 wt %, less than 40 wt %, less than 38 wt %, less than 36 wt %, less than 34 wt %, less than 32 wt %, less than 30 wt %, less than 28 wt %, less than 26 wt %, less than 24 wt %, less than 22 wt %, less than 20 wt %, less than 19 wt %, less than 17 wt %, less than 15 wt %, less than 13 wt %, less than 11 wt %, less than 9 wt %, less than 7 wt %, or less than 5 wt %. In terms of lower limits, the filler concentration can be greater than 1 wt %, e.g., greater than 5 wt %, greater than 7 wt %, greater than 9 wt %, greater than 11 wt %, greater than 13 wt %, greater than 15 wt %, greater than 17 wt %, greater than 19 wt %, greater than 20 wt %, greater than 22 wt %, greater than 24 wt %, greater than 26 wt %, greater than 28 wt %, greater than 30 wt %, greater than 32 wt %, greater than 34 wt %, greater than 36 wt %, greater than 38 wt %, greater than 40 wt %, or greater than 45 wt %. Higher concentrations, e.g., greater than 50 wt %, and lower concentrations, e.g., less than 0.5 wt %, are also contemplated.

The mass ratio of the first filler to the second filler in the adhesive composition can, for example, range from 1 to 99, e.g., from 1 to 16, from 1.6 to 24.9, from 2.5 to 39.5, from 4 to 62.5, or from 6.3 to 99. The mass ratio of the first filler to the second filler can range from 10 to 75, e.g., from 10 to 49, from 16.5 to 55.5, from 23 to 62, from 29.5 to 68.5, or from 36 to 75. The mass ratio of the first filler to the second filler can range from 1 to 6, e.g., from 1 to 4, from 1.5 to 4.5, from 2 to 5, from 2.5 to 5.5, or from 3 to 6. In terms of upper limits, the mass ratio of the first filler to the second filler can be less than 99, e.g., less than 75, less than 68.5, less than 62, less than 55.5, less than 49, less than 42.5, less than 36, less than 29.5, less than 23, less than 16.5, less than 10, less than 6, less than 5.5, less than 5, less than 4.5, less than 4, less than 3.5, less than 3, less than 2.5, less than 2, or less than 1.5. In terms of lower limits, the mass ratio of the first filler to the second filler can be greater than 1, e.g., greater than 1.5, greater than 2, greater than 2.5, greater than 3, greater than 3.5, greater than 4, greater than 4.5, greater than 5, greater than 5.5, greater than 6, greater than 10, greater than 16.5, greater than 23, greater than 29.5, greater than 36, greater than 42.5, greater than 49, greater than 55.5, greater than 62, greater than 68.5, or greater than 75. Higher mass ratios, e.g., greater than 99, are also contemplated.

In some embodiments, at least one of the at least two fillers of the adhesive composition is not halogenated. In certain aspects, the adhesive composition does not include a halogenated filler. In some embodiments, at least one of the at least two fillers of the adhesive composition includes phosphorous-based materials, oxide, clay, silica, metal, metal hydroxides, wax, or a combination thereof. In certain aspects, each filler of the adhesive composition includes phosphorous-based materials, oxide, clay, silica, metal, metal hydroxides, wax, or a combination thereof. In some embodiments, at least one of the at least two fillers includes phosphorous-based material, oxide, clay, silica, metal, metal hydroxides, wax, or a combination thereof. In certain aspects, each filler of the adhesive composition includes phosphorous-based materials, oxide, clay, silica, metal, metal hydroxide, wax, or a combination thereof. In some embodiments, at least one of the at least two fillers includes phosphorous-based materials, oxide, clay, silica, a metal, a metal hydroxide, wax, combination thereof. In certain aspects, each filler of the adhesive composition includes phosphorous-based materials, silica, a metal hydroxide, or a combination thereof.

In one embodiment, at least one filler is a metal hydroxide of aluminum oxide hydroxide. In another embodiment, at least one filler is a metal hydroxide of aluminum trihydroxide. In one embodiment, at least one filler is a metal hydroxide of magnesium hydroxide.

In one embodiment, at least one filler is hydrophobic silica. In one embodiment, at least one filler is hydrophilic silica. In another embodiment, the silica is a fumed silica.

In one embodiment, at least one filler is a wax comprised of ethylene vinylacetate. In another embodiment, at least one filler is a wax comprised of polyolefins. In yet another embodiment, at least one filler is a wax comprised of ethylene acrylic acid.

In one embodiment at least one filler is a clay comprised of phyllosilicates. In another embodiment, at least one filler is a clay comprised of smectite. In one embodiment, at least one filler is a clay comprised of montmorillonite.

The provided adhesive compositions can exhibit strong adhesion at high filler concentration even when the filler includes particles larger than nanometer-scale. Furthermore, the use of larger filler particles in the adhesive composition has been found to give particularly desirable performance characteristics when the adhesive composition is used in relatively thick adhesive layers. The average characteristic particle dimension of at least one of the at least two fillers of the adhesive composition can, for example, range from 20 nm to 30 µm, e.g., from 20 nm to 1.6 µm, from 42 nm to 3.3 µm, from 86 nm to 6.9 µm, from 180 nm to 14 µm, or from 370 nm to 30 µm. The average characteristic particle dimension of at least one of the fillers can range from 200 nm to 30 µm, e.g., from 200 nm to 4 µm, from 330 nm to 6.7 µm, from 540 nm to 11 µm, from 900 nm to 18 µm, or from 1.5 µm to 30 µm. The average characteristic particle dimension of at least one of the fillers can range from 200 nm to 10 µm, e.g., from 200 nm to 2.1 µm, from 300 nm to 3.1 µm, from 440 nm to 4.6 µm, from 650 nm to 6.8 µm, or from 960 nm to 10 µm. The average characteristic particle dimension of at least one of the fillers can range from 500 nm to 10 µm, e.g., from 500 nm to 3 µm, from 670 nm to 4.1 µm, from 910 nm to 5.5 µm, from 1.2 µm to 7.4 µm, or from 1.7 µm to 10 µm. The average characteristic particle dimension of at least one of the fillers can range from 800 nm to 10 µm, e.g., from 800 nm to 3.6 µm, from 1 µm to 4.7 µm, from 1.3 µm to 6 µm, from 1.7 µm to 7.8 µm, or from 2.2 µm to 10 µm. In terms of upper limits, the average characteristic particle dimension of at least one filler can be less than 30 μm, e.g., less than 18 μm, less than 11 μm, less than 7.8 μm, less than 6 μm, less than 4.7 μm, less than 3.6 μm, less than 2.8 μm, less than 2.2 μm, less than 1.7 μm, less than 1.3 μm, less than 1 μm, less than 800 nm, less than 540 nm, less than 330 nm, less than 200 nm, less than 180 nm, less than 86 nm, or less than 42 nm. In terms of lower limits, the average characteristic particle dimension can be greater than 20 nm, e.g., greater than 42 nm, greater than 86 nm, greater than 180 nm, greater than 200 nm, greater than 330 nm, greater than 540 nm, greater than 800 nm, greater than 1 μm, greater than 1.3 μm, greater than 1.7 μm, greater than 2.2 μm, greater than 2.8 μm, greater than 3.6 μm, greater than 4.7 μm, greater than 6 μm, greater than 7.8 μm, greater than 11 μm, or greater than 18 μm. Larger average dimensions, e.g., greater than 30 μm, and smaller average dimensions, e.g., less than 20 nm, are also contemplated. In some embodiments, each filler of the adhesive composition independently has an average particle dimension within one of the aforementioned ranges or limits.

In some embodiments, at least one of the at least two fillers of the adhesive composition is polydisperse, e.g., the filler can include particles having a variety of characteristic particle dimensions. By thus including particles that are not limited to a narrow size range, the provided adhesive compositions advantageously can be produced at a lower cost. In some embodiments, each filler of the adhesive composition is polydisperse. In alternative embodiments, at least one of the at least two fillers of the adhesive composition is monodisperse, e.g., the filler can include particles having characteristic particle dimensions less than 20%, less than 18%, less than 16%, less than 14%, less than 12%, less than 10%, less than 8%, less than 6%, less than 4%, or less than 2% different from the average characteristic particle dimension of the filler. In some embodiments, each filler of the adhesive composition is monodisperse.

In some embodiments, the adhesive composition includes a first filler having an average characteristic particle dimension that is significantly different from that of a second filler of the composition. The ratio of the average characteristic particle dimensions of the first filler and the second filler can, for example, range from 1 to 6, e.g., from 1 to 4, from 1.5 to 4.5, from 2 to 5, from 2.5 to 5.5, or from 3 to 6. In terms of upper limits, the ratio of the average characteristic particle dimensions of the first filler and the second filler can be less than 6, e.g., less than 5.5, less than 5, less than 4.5, less than 4, less than 3.5, less than 3, less than 2.5, less than 2, or less than 1.5. In terms of lower limits, the ratio of the average characteristic particle dimensions of the first filler and the second filler can be greater than 1, e.g., greater than 1.5, greater than 2, greater than 2.5, greater than 3, greater than 3.5, greater than 4, greater than 4.5, greater than 5, or greater than 5.5. Higher ratios, e.g., greater than 6, are also contemplated.

The adhesive compositions disclosed herein can include one or more solid fillers, one or more liquid fillers, or combinations thereof. In some embodiments, at least one of the at least two fillers of the adhesive composition is a liquid at a temperature greater than −40° C., e.g., greater than −34° C., greater than −28° C., greater than −22° C., greater than −16° C., greater than −10° C., greater than −4° C., greater than 2° C., greater than 8° C., greater than 14° C., or greater than 20° C. In certain aspects, every filler of the adhesive composition is a liquid at a temperature greater than −40° C., e.g., greater than −34° C., greater than −28° C., greater than −22° C., greater than −16° C., greater than −10° C., greater than −4° C., greater than 2° C., greater than 8° C., greater than 14° C., or greater than 20° C. In some embodiments, at least one filler of the adhesive composition is a solid at a temperature less than 50° C., e.g., less than 20° C., less than 14° C., less than 8° C., less than 2° C., less than −4° C., less than −10° C., less than −16° C., less than −22° C., less than −28° C., less than −34° C., or. In certain aspects, every filler of the adhesive composition is a solid at a temperature greater than −40° C., e.g., greater than −34° C., greater than −28° C., greater than −22° C., greater than −16° C., greater than −10° C., greater than −4° C., greater than 2° C., greater than 8° C., greater than 14° C., or greater than 20° C. In some embodiments, at least one filler of the adhesive composition is a liquid and at least one filler of the adhesive composition is a solid at a temperature greater than −40° C., e.g., greater than −34° C., greater than −28° C., greater than −22° C., greater than −16° C., greater than −10° C., greater than −4° C., greater than 2° C., greater than 8° C., greater than 14° C., or greater than 20° C.

Acrylic Copolymer

The acrylic copolymers of the adhesive compositions disclosed herein are those developed with controlled architectural functionality. When these polymers are crosslinked, an extremely uniform polymer network is obtained. The crosslinking of a random functionalized polymer generally results in a network having parts that are much more densely crosslinked than others on a nanoscale level. This can result in a poorer adhesion-cohesion balance. In contrast, a controlled architecture polymer (CAP) network, such as those of the provided adhesive compositions, is characterized by high cohesion and high polymer flexibility resulting in a high tackiness and peel adhesion. Other non-CAP networks can sacrifice tackiness when being more densely crosslinked.

The CAP network acrylic copolymer of the adhesive composition described herein contains at least a first block and a second block. In many embodiments, the first block is different from the second block either chemically or structurally. Each block independently includes at least one functional group that is capable of undergoing a crosslinking reaction. The blocks can have controlled size and placement for tailored properties, allowing for control of cross-link density via placement of reactive functionalities in specific segments of the polymer. For example, placing reactive functionalities in segments adjacent to the polymer end groups can yield high modulus. Alternatively or additionally, placing the reactive functionalities in the central segment(s) of the polymer can yield significant viscous liquid character.

The acrylic copolymers of the invention can be prepared using any of the controlled radical polymerization processes generally known in the art, including atom-transfer radical polymerization (ATRP); rapid addition-fragmentation chain transfer (RAFT); and stable free radical polymerization (SFRP). Nitroxide-mediated polymerization (NMP) is an example of an SFRP process suitable for use with the disclosed acrylic copolymers.

The crosslinkable functional groups of the first and second blocks of the acrylic copolymer are not particularly restricted, and can include, for example, one or more crosslinkable silyl, hydroxyl, carboxyl, carbonyl, carbonate ester, isocyanato, epoxy, vinyl, amino, amide, imide, anhydride, mercapto, acid, acrylamide, acetoacetyl, alkoxymethylol, and cyclic ether groups.

Hydroxy functional monomers include, for example, hydroxy ethyl(meth)acrylate, hydroxy isopropyl (meth)acrylate, hydroxy butyl(meth)acrylate and the like. Epoxy functional monomers include, for example, glycidyl methacrylate and glycidal acrylate. The acid containing monomers include unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. Anhydride containing monomers include maleic anhydride, itaconic anhydride, citraconic anhydride and the like.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof.

Vinyl groups include, for example, vinyl esters, vinyl ethers, vinyl amides, and vinyl ketones. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like. The polymerizable silanes include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyltrimethoxysilane, γ-methacryloxypropyltriethoxysilane, γ-methacryloxypropyltripropoxysilane, γ-methacryloxydimethoxysilane, γ-methacryloxypropylmethyldimethoxysilane, γ-methacryloxypropylmethyldiethoxysilane, γ-methacryloxypropylmethyldipropoxysilane, γ-methacryloxymethyldimethoxysilane, γ-methacryloxymethyltrimethoxysilane, γ-methacryloxymethyltriethoxysilane, (methacryloxymethyl)methyldimethoxysilane, (methacryloxymethyl)methyldiethoxysilane, γ-methacryloxypropyltriacetoxysilane, γ-acryloxypropyltrimethoxysilane, γ-acryloxypropyltriethoxysilane, γ-methacryloxymethyldiethoxysilane, γ-acryloxypropyltripropoxysilane, γ-acryloxypropylmethyldimethoxysilane, γ-acryloxypropylmethyldiethoxysilane, acryloxypropylmethyldipropoxysilane, and the like.

In some embodiments, the acrylic copolymer does not include phosphorous or nitrogen. In some embodiments, the acrylic copolymer includes butylacrylate, ethylhexylacrylate, octylacrylate, acetic acid, or combinations thereof. CAP networks are described in further detail in U.S. Pat. Nos. 9,644,063 and 9,738,740, and U.S. Patent Application No. 2011/0118372, each of which are incorporated herein in its entirety for all purposes.

Crosslinker

The concentration of the crosslinker in the adhesive composition can be selected to determine the extent of crosslinking of the acrylic copolymer that occurs during curing of the adhesive composition. The concentration of the crosslinker can, for example, range from 0.01 wt % to 4 wt %, e.g., from 0.01 wt % to 2.4 wt %, from 0.01 wt % to 2.0 wt %, from 0.4 wt % to 2.8 wt %, from 0.8 wt % to 3.2 wt %, from 1.2 wt % to 3.6 wt %, or from 1.6 wt % to 4 wt %. The concentration of the crosslinker can range from 0.1 wt % to 2.0 wt %, e.g., from 0.1 wt % to 0.6 wt %, from 0.13 wt % to 0.81 wt %, from 0.18 wt % to 1.1 wt %, from 0.25 wt % to 1.5 wt %, or from 0.33 wt % to 2 wt %. The concentration of the crosslinker can range from 0.2 wt % to 1.5 wt %, e.g., from 0.2 wt % to 0.98 wt %, from 0.33 wt % to 1.11 wt %, from 0.46 wt % to 1.24 wt %, from 0.59 wt % to 1.37 wt %, or from 0.72 wt % to 1.5 wt %. The concentration of the crosslinker can range from 0.01 wt % to 0.3 wt %, e.g., from 0.01 wt % to 0.18 wt %, from 0.03 wt % to 0.21 wt %, from 0.06 wt % to 0.24 wt %, from 0.09 wt % to 0.27 wt %, or from 0.12 wt % to 0.3 wt %. In terms of upper limits, the crosslinker concentration can be less than 4 wt %, e.g., less than 3.6 wt %, less than 3.2 wt %, less than 2.8 wt %, less than 2.4 wt %, less than 2 wt %, less than 1.6 wt %, less than 1.2 wt %, less than 0.8 wt %, less than 0.4 wt %, less than 0.3 wt %, less than 0.27 wt %, less than 0.24 wt %, less than 0.21 wt %, less than 0.18 wt %, less than 0.15 wt %, less than 0.12 wt %, less than 0.09 wt %, less than 0.06 wt %, or less than 0.03 wt %. In terms of lower limits, the crosslinker concentration can be greater than 0.01 wt %, e.g., greater than 0.03 wt %, greater than 0.06 wt %, greater than 0.09 wt %, greater than 0.12 wt %, greater than 0.15 wt %, greater than 0.18 wt %, greater than 0.21 wt %, greater than 0.24 wt %, greater than 0.27 wt %, greater than 0.3 wt %, greater than 0.4 wt %, greater than 0.8 wt %, greater than 1.2 wt %, greater than 1.6 wt %, greater than 2 wt %, greater than 2.4 wt %, greater than 2.8 wt %, greater than 3.2 wt %, or greater than 3.6 wt %. Higher concentrations, e.g., greater than 4 wt %, and lower concentrations, e.g., less than 0.01 wt %, are also contemplated.

Crosslinker types suitable for use in the provided adhesive compositions include isocyanate, melamine formaldehyde, anhydride, epoxy, titanium esters, aziridines, carbodiimides, metal chelates, oxazolines, and silicone hydride. Examples of a metal chelate crosslinker may include, but are not limited to an aluminum crosslinker, a zirconium crosslinker, and a titanium crosslinker. Suitable polyfunctional aziridines include, for example, trimethylolpropane tris[3-aziridinylpropionate]; trimethylolpropane tris[3-(2-methylaziridinyl) propionate]; trimethylolpropane tris[2-aziridinylbutyrate]; tris(1-aziridinyl)phosphine oxide; tris(2-methyl-1-aziridinyl)phosphine oxide; penta-erythritoltris[3-(1-aziridinyl) propionate]; and pentaerythritol tetrakis[3-(1-aziridinyl)propionate]. Combinations of more than one polyfunctional aziridine can also be used. Examples of commercially available polyfunctional aziridines include NEOCRYL® CX-100 from Zeneca Resins;, and XAMA®-2, XAMA®-7 and XAMA®-220 from Bayer Material Science.

Examples of suitable multifunctional aziridine amides include 1,1'-(1,3-phenylenedicarbonyl)bis[2-methyl aziridine]; 2,2,4-trimethyladipoyl bis[2-ethyl aziridine]; 1,1'azelaoylbis[2-methyl aziridine]; and 2,4,6-tris(2-ethyl-1-aziridinyl)-1,3,5 triazine.

Metal chelate crosslinking agents can be compounds prepared by coordinating multivalent metals such as Al, Fe, Zn, Sn, Ti, Sb, Mg and V with acetylacetone or ethyl acetoacetonate.

Among the isocyanate crosslinking agents that can be used are aromatic, aliphatic and cycloaliphatic diisocyanates and triisocyanates. Examples include 2,4-toluene diisocyanate, m-phenyl ene diisocyanate, 4-chloro-1,3-phenyl ene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'-methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5-naphthalene diisocyanate, or their reactants with polyol such as trimethylolpropane.

Other useful crosslinking agents include monomeric and polymeric melamine crosslinkers, such as CYMEL® 303 and CYMEL® 370 available from Cytec.

Crosslinking may occur through various curing methods including but not limited to radiation curing, electron beam curing, heat curing, peroxide curing, and combinations thereof. The peroxide curing may occur using benzoyl peroxide (BPO), lauroyl peroxide, lauryl peroxide, dichlorobenzoyl peroxide, or combinations thereof.

Other Components

The adhesive compositions disclosed herein can further include additives such as diluents, antioxidants, tackifiers and the like.

In some embodiments, the adhesive composition includes a resin. Suitable resins for use in the adhesive composition disclosed herein include, but are not limited to, rosin esters, terpene resins, petroleum hydrocarbon resins, coumarone-indene resins, styrene resins, xylene resins, and combinations thereof. There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins such as ESCOREZ™ 1304, manufactured by Exxon Chemical Co., and aromatic or alicyclic hydrocarbon resins based on $C_9$ hydrocarbons, $C_5$ hydrocarbons, dicyclopentadiene, coumarone, indene, styrene, substituted styrenes and styrene derivatives and the like can also be used.

Hydrogenated and partially hydrogenated resins such as REGALREZ™ 1018, REGALREZ™ 1033, REGALREZ™ 1078, REGALREZ™ 1094, REGALREZ™ 1126, REGALREZ™ 3102, REGALREZ™ 6108, etc., produced by Eastman Chemical Company, can be used. Various terpene phenolic resins of the type SP 560 and SP 553, manufactured and sold by Schenectady Chemical Inc., NIREZ™ 1100, manufactured and sold by Reichold Chemical Inc., and PICCOLYTE® S-100, manufactured and sold by Hercules Corporation, are particularly useful tackifiers for the disclosed compositions. Various mixed aliphatic and aromatic resins, such as Hercotex AD 1100, manufactured and sold by Hercules Corporation, can be used.

In another embodiment, the added resin may serve a dual purpose. For example, a resin such as WINGSTAY® L, a butylated reaction product of para-cresol and dicyclopentadiene with an average molecular weight of 650 produced by Eliokem, can serve both as a tackifier and an antioxidant.

Performance Characteristics

An advantage of the adhesive compositions disclosed herein is that they are surprisingly capable of exhibiting strong adhesive properties while including relatively high concentrations of fillers. For reasons discussed above, it is challenging for conventional acrylic adhesive compositions to maintain desired bonding characteristics as the amount of filler in the compositions is increased, e.g., to improve the flame retardancy of the compositions.

One measure of the adhesive performance of compositions is peel adhesion, which can be determined with relation to a stainless steel surface according to the standard protocol ASTM D3330 (2018). The peel adhesion of the adhesive compositions disclosed herein can, for example, range from 5 N/inch to 50 N/inch, e.g., from 5 N/inch to 32 N/inch, from 9.5 N/inch to 36.5 N/inch, from 14 N/inch to 41 N/inch, from 18.5 N/inch to 45.5 N/inch, or from 23 N/inch to 50 N/inch. The adhesive composition peel adhesion can range from 10 N/inch to 35 N/inch, e.g., from 10 N/inch to 25 N/inch, from 12.5 N/inch to 27.5 N/inch, from 15 N inch to 30 N/inch, from 17.5 N/inch to 32.5 N/inch, or from 20 N/inch to 35 N/inch. In terms of lower limits, the peel adhesion can be greater than 5 N/inch, e.g., greater than 10 N/inch, greater than 12.5 N/inch, greater than 15 N/inch, greater than 17.5 N/inch, greater than 20 N/inch, greater than 22.5 N/inch, greater than 25 N/inch, greater than 27.5 N/inch, greater than 30 N/inch, greater than 32.5 N/inch, greater than 36.5 N/inch, greater than 41 N/inch, or greater than 45.5 N/inch. Higher peel adhesion, e.g., greater than 50 N/inch, are also contemplated.

Importantly, these high peel adhesions can be achieved as the concentration of filler in the adhesive composition is increased to levels beyond that of conventional fillers. In some embodiments, the combined concentration of the at least two fillers in the adhesive composition is greater than 25 wt %, the concentration of the crosslinker in the adhesive composition is greater than 0.4 wt %, and the adhesive composition has a peel adhesion greater than 20 N/inch. In some embodiments, the combined concentration of the at least two fillers in the adhesive composition is greater than 35 wt %, the concentration of the crosslinker in the adhesive composition is greater than 0.6 wt %, and the adhesive composition has a peel adhesion greater than 15 N/inch. In some embodiments, the combined concentration of a first filler and a second filler in the adhesive composition ranges from 20 wt % to 40 wt %, the mass ratio of the first filler to the second filler ranges from 1 to 10, and the adhesive composition has a peel adhesion greater than 25 N/inch.

Methods of Preparing

The present disclosure also relates to processes of producing the provided adhesive compositions. The method includes providing the adhesive composition described herein wherein the acrylic copolymer has a controlled architecture polymer network. The methods include providing a CAP network acrylic copolymer, a crosslinker reactive with functional groups of the copolymer, and at least two fillers. The methods can further include selecting the type and relative amounts of the acrylic copolymer, the crosslinker, and the fillers to provide desired adhesive and flame retardancy properties to the resulting adhesive composition. The methods further include combining the acrylic copolymer, the crosslinker, and the fillers to produce the adhesive composition.

In some embodiments, the combined concentration of the at least two fillers in the combined adhesive composition is greater than 0.5 wt %, e.g., greater than 1 wt %, greater than 2 wt %, greater than 5 wt %, greater than 7 wt %, greater than 9 wt %, greater than 11 wt %, greater than 13 wt %, greater than 15 wt %, greater than 17 wt %, greater than 19 wt %, greater than 20 wt %, greater than 22 wt %, greater than 24 wt %, greater than 26 wt %, greater than 28 wt %, greater than 30 wt %, greater than 32 wt %, greater than 34 wt %, greater than 36 wt %, greater than 38 wt %, greater than 40 wt %, or greater than 45 wt %. In some embodiments, the combined adhesive composition includes a first filler and a second filler, and the mass ratio of the first filler to the second filler ranges from 1 to 99, e.g., from 1 from 1 to 16, from 1.6 to 24.9, from 2.5 to 39.5, from 4 to 62.5, or from 6.3 to 99.

The components of the adhesive composition can be mixed and blended together to produce the adhesive composition, or can be formed in situ using appropriate reactants. The terms "adding" or "combining" without further clarification are intended to encompass either the addition of the material itself to the composition or the in situ formation of the material in the composition. In another embodiment, two or more materials to be combined with the composition are simultaneously added via masterbatch.

Tapes

The present disclosure also relates to tapes that include at least one adhesive layer of an adhesive composition provided herein. An advantage of the disclosed adhesive compositions is that the thicknesses of tape adhesive layers having the provided composition can be varied more than when using previous conventional acrylic adhesives with fillers. In particular, by using larger filler particles, the adhesive properties remain relatively the same as adhesives using smaller particles, even when lower coat weights are used. The thickness of each of the one or more adhesive layers of the tape can, for example, independently range from 10 µm to 300 µm, e.g., from 10 µm to 77 µm, from 14 µm to 110 µm, from 20 µm to 150 µm, from 28 µm to 210 µm, or from 39 µm to 300 µm. In terms of upper limits, the adhesive layer thickness can be less than 300 µm, e.g., less than 210 µm, less than 150 µm, less than 110 µm, less than 77 µm, less than 55 µm, less than 39 µm, less than 28 µm, less than 20 µm, or less than 14 µm. In terms of lower limits, the adhesive layer thickness can be greater than 10 µm, e.g., greater than 14 µm, greater than 20 µm, greater than 28 µm, greater than 39 µm, greater than 55 µm, greater than 77 µm, greater than 110 µm, greater than 150 µm, or greater than 210 µm. Larger thicknesses, e.g., greater than 300 µm, and smaller thicknesses, e.g., less than 10 µm, are also contemplated.

The coat weight of each of the one or more adhesive layers of the tape can, for example, independently range from 30 gsm to 300 gsm, e.g., from 30 gsm to 192 gsm, from 57 gsm to 219 gsm, from 84 gsm to 246 gsm, from 111 gsm to 273 gsm, or from 138 gsm to 300 gsm. In terms of upper limits, the adhesive layer coat weights can each be less than 300 gsm, e.g., less than 273 gsm, less than 246 gsm, less than 219 gsm, less than 192 gsm, less than 165 gsm, less than 138 gsm, less than 111 gsm, less than 84 gsm, or less than 57 gsm. In terms of lower limits, the adhesive layer coat weights can each be greater than 30 gsm, e.g., greater than 57 gsm, greater than 84 gsm, greater than 111 gsm, greater than 138 gsm, greater than 165 gsm, greater than 192 gsm, greater than 219 gsm, greater than 246 gsm, or greater than 273 gsm. Higher coat weights, e.g., greater than 300 gsm, and lower coat weights, e.g., less than 30 gsm, are also contemplated.

In some embodiments, e.g., for transfer tape applications, the tape includes a backing layer. The backing layer can be joined to and disposed directly adjacent to one of the at least one adhesive layers of the tape. The thickness of the backing layer of the tape can, for example, range from 5 µm to 10 mm, e.g., from 5 µm to 480 µm, from 11 µm to 1 mm, from 23 µm to 2.2 mm, from 49 µm to 4.7 mm, or from 100 µm to 10 mm. In terms of upper limits, the backing layer thickness can be less than 10 mm, e.g., less than 4.7 mm, less than 2.2 mm, less than 1 mm, less than 480 µm, less than 220 nm, less than 100 nm, less than 49 nm, less than 23 nm, or less than 11 nm. In terms of lower limits, the backing layer thickness can be greater than 5 µm, e.g., greater than 11 µm, greater than 23 µm, greater than 49 µm, greater than 100 µm, greater than 220 µm, greater than 480 µm, greater than 1 mm, greater than 2.2 mm, or greater than 4.7 mm. Larger thicknesses, e.g., greater than 10 mm, and smaller thicknesses, e.g., less than 10 µm, are also contemplated. The backing layer can include materials such as plastic, foam, cloth, paper, or combinations thereof. In some embodiments, the backing layer includes polyethylene terephthalate.

In some embodiments, the backing layer is a release liner. The tape can include one or more release liners disposed on one or both of the major exterior faces of the tape. The release liners can function as a protective cover such that the release liners remain in place until the tape is ready for attachment to an object, surface, or substrate. If a liner or release liner is included in the tape, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material, e.g., the release liner is a siliconized release liner. As will be appreciated, the release coated face of the liner is placed in contact with the otherwise exposed face of an outer adhesive layer. Prior to application of the tape to a surface of interest, the liner is removed to thereby expose the adhesive layer of the tape. The liner can be in the form of a single sheet. Alternatively, the liner can be in the form of multiple sections or panels.

In some embodiments, the backing layer is a carrier layer. Although tapes including the disclosed adhesive compositions can have high flame retardancy properties, in certain applications and configurations, the inclusion of a carrier layer can further enhance the fire resistance of the tape. The carrier layer of the tape can be present as part of a self-wound tape system or construction. The tape construction can include one or more carrier layers.

In some embodiments, the carrier layer includes a metal, a plastic, a fabric, or a combination thereof. A carrier layer or release liner of the tape can include, for example, low density polyethylene, high density polyethylene, polypropylene, polytetrafluoroethylene, polyether ether ketone, polyimide, polyamide, or a combination thereof. In some embodiments, the carrier layer includes a scrim. The scrim material of the carrier layer can be an open scrim material or a closed scrim material.

Methods of Preparing Tape

The present disclosure also relates to processes of producing the provided adhesive tapes. The methods include providing adhesive composition as disclosed herein, and a backing material in the form of a film or layer. The methods further include coating a layer of the adhesive composition onto the formed backing layer. The thickness and coat weight of the adhesive layer can be as described above. The method can further include curing the adhesive subsequent to coating the backing layer with the adhesive composition. The curing can be carried out under conditions suitable for the crosslinker to react with the functional groups of the adhesive composition acrylic copolymer.

EMBODIMENTS

The following embodiments are contemplated. All combinations of features and embodiments are contemplated.

Embodiment 1: An adhesive composition comprising: an acrylic copolymer comprising a first block and a second block, wherein each of the first block and the second block independently comprises a crosslinkable functional group, and wherein the acrylic copolymer has a controlled architecture polymer (CAP) network; a crosslinker reactive with the crosslinkable functional groups; and at least two fillers.

Embodiment 2: An embodiment of embodiment 1, wherein the concentration of the crosslinker in the adhesive composition ranges from 0.01 wt % to 2.0 wt %.

Embodiment 3: An embodiment of embodiment 1 or 2, wherein the concentration of the crosslinker in the adhesive composition is greater than 0.3 wt %.

Embodiment 4: An embodiment of any of the embodiments of embodiment 1-3, wherein the combined concentration of the at least two fillers in the adhesive composition is less than 50 wt %.

Embodiment 5: An embodiment of any of the embodiments of embodiment 1-3, wherein the combined concentration of the at least two fillers in the adhesive composition ranges from 0.5 wt % to 50 wt %.

Embodiment 6: An embodiment of any of the embodiments of embodiment 1-3, wherein the combined concentration of the at least two fillers in the adhesive composition ranges from 1 wt % to 45 wt %.

Embodiment 7: An embodiment of any of the embodiments of embodiment 1-3, wherein the combined concentration of the at least two fillers in the adhesive composition ranges from 1 wt % to 10 wt %.

Embodiment 8: An embodiment of any of the embodiments of embodiment 1-3, wherein the combined concentration of the at least two fillers in the adhesive composition ranges from 20 wt % to 40 wt %.

Embodiment 9: An embodiment of any of the embodiments of embodiment 1-8, wherein the at least two fillers comprise a first filler and a second filler, and wherein the mass ratio of the first filler to the second filler ranges from 1 to 99.

Embodiment 10: An embodiment of embodiment 9, wherein the mass ratio of the first filler to the second filler ranges from 10 to 75.

Embodiment 11: An embodiment of any of the embodiments of embodiment 1-10, wherein the adhesive composition has a peel adhesion greater than 15 N/inch.

Embodiment 12: An embodiment of any of the embodiments of embodiment 1-10, wherein the adhesive composition has a peel adhesion greater than 20 N/inch.

Embodiment 13: An embodiment of any of the embodiments of embodiment 1-12, wherein at least one of the at least two fillers is not halogenated.

Embodiment 14: An embodiment of any of the embodiments of embodiment 1-13, wherein at least one of the at least two fillers comprises phosphorous-based materials, silica, metal, or a metal hydroxide.

Embodiment 15: An embodiment of any of the embodiments of embodiment 1-14, wherein at least one of the at least two fillers comprises phosphorous-based materials, metal oxide, oxide, clay, or silica.

Embodiment 16: An embodiment of any of the embodiments of embodiment 1-15, wherein at least one of the at least two fillers comprises particles having an average characteristic particle dimension that is greater than 20 nm.

Embodiment 17: An embodiment of any of the embodiments of embodiment 1-16, wherein at least one of the at least two fillers comprises particles having an average characteristic particle dimension ranging from 0.2 µm to 30 µm.

Embodiment 18: An embodiment of any of the embodiments of embodiment 1-17, wherein at least one of the at least two fillers is a liquid at a temperature above −40° C.

Embodiment 19: An embodiment of any of the embodiments of embodiment 1-18, wherein at least one of the at least two fillers is a solid at a temperature less than 50° C.

Embodiment 20: An embodiment of any of the embodiments of embodiment 1-19, wherein the acrylic polymer does not comprise phosphorus or nitrogen Embodiment 21: An embodiment of any of the embodiments of embodiment 1-20, further comprising: a resin.

Embodiment 22: A method of preparing an adhesive composition, the method comprising: providing an acrylic copolymer, a crosslinker, and at least two fillers, wherein the acrylic copolymer comprises a first block and a second block, wherein each of the first block and the second block comprises a crosslinkable functional group, wherein the acrylic copolymer has a CAP network, and wherein the crosslinker is reactive with the crosslinkable functional groups; and combining the acrylic copolymer, the crosslinker, and the at least two fillers to form the adhesive composition, wherein the combined concentration of the at least two fillers in the adhesive composition is greater than 15 wt %, wherein the at least two fillers comprises a first filler and a second filler, and wherein the mass ratio of the first filler to the second filler ranges from 1 to 99.

Embodiment 23: A tape comprising: at least one adhesive layer comprising the adhesive composition of an embodiment of any of the embodiments of embodiment 1-21.

Embodiment 24: An embodiment of embodiment 23, wherein each of the at least one adhesive layers independently has a thickness ranging from 10 µm to 300 µm.

Embodiment 25: An embodiment of embodiment 23 or 24, further comprising: a backing layer joined to one of the at least one adhesive layers.

Embodiment 26: An embodiment of embodiment 25, wherein the backing layer has a thickness ranging from 5 µm to 10 mm.

Embodiment 27: An embodiment of embodiment 25 or 26, wherein the backing layer comprises polyethylene terephthalate.

Embodiment 28: An embodiment of any of the embodiments of embodiment 25-27, wherein the backing layer is a siliconized release liner.

Embodiment 29: An embodiment of any of the embodiments of embodiment 25-28, wherein the backing layer is a carrier layer.

Embodiment 30: An embodiment of embodiment 29, wherein the carrier layer comprises one or more materials selected from the group consisting of low density polyethylene, high density polyethylene, polypropylene, polytetrafluoroethylene, polyether ether ketone, polyimide, or polyamide.

Embodiment 31: An embodiment of embodiment 29 or 30, wherein the carrier layer comprises a scrim.

Embodiment 32: An embodiment of any of the embodiments of embodiment 29-31, wherein the carrier layer comprises a metal, plastic, or fabric.

Embodiment 33: A method of applying a tape to a surface, the method comprising: providing a surface having an outer face; providing the tape of an embodiment of any of the embodiments of embodiment 23-32; and adhering the adhesive layer of the tape to the outer face of the surface, thereby applying the tape to the surface.

Embodiment 34: A taped surface comprising: a surface having an outer face; and the tape of an embodiment of any of the embodiments of embodiment 23-32 adhered to the outer face of the surface.

EXAMPLES

The present disclosure will be better understood in view of the following non-limiting examples.

A series of adhesives were prepared having the compositions shown in Table 1. The fillers of the compositions are referred to as Filler A and Filler B in the Table 1. In some embodiments, Filler B may be designated as either filler B1 or filler B2 where both B1 and B2 may be considered to be Filler B. In Examples 1 through 12, Examples 15 through 16 and Comparative E through I, Filler B is B1, where Filler B1 is represented by a metalhydroxide. In Examples 13 through 14 and Comparative J, this Filler B is B2, which is a silica based filler. For each of these compositions, peel adhesion was measured by laminating a 37-μm polyethylene terephthalate backing layer to an exemplary or comparative adhesive layer in a single pass using a 4.5-pound roll. This laminate was then cut into testing strips measuring 25 mm wide by 15 cm long. For each test, one of these strips was then laminated to a stainless steel panel and maintained for a dwell time of 24 hours. After this dwell time, the strip was peeled off from the panel at a speed of 300 mm/min under an angle of 180°.

adhesion values for these comparative examples decrease to less than 10 N/inch at filler concentrations greater than 25 wt %.

In contrast, the Table 1 results for Examples 1-9 clearly show that the peel adhesion values of these adhesive compositions, which each include both Filler A and Filler B1, surprisingly have a much less pronounced decay as filler concentrations are increased. In many embodiments, adding both Filler A and Filler B together provides improved peel adhesion over only Filler A or only Filler B when calculated for equal total concentrations, independently of the type of Filler B used. In many instances, higher adhesion values for certain Filler A and Filler B mixtures may be unexpectedly achieved compared to comparatives with a lower total concentration (see Example 9 compared to Comparative D and Comparative G, or Example 5 compared to Comparative F) or no filler (see Examples 2 and 13 compared to Comparative A.).

In addition, there may include a wide range of crosslinker concentrations, including up to 2.0% in Examples 10 and 16 or even up to 3.5% in Example 11. For adhesives with crosslinker concentrations up to 2.0%, there may be an increase in peel adhesion. In many embodiments, there may be an increase in peel adhesion with crosslinker concentrations up to 2.0% when at least two fillers are used (see Table 1 for comparison of Examples and Comparative samples). For example, Example 16 still shows a slight benefit of using

TABLE 1

|  | Total Filler Concentration (wt %) | Filler Ratio (A:B) | Filler type | Crosslinker Concentration (wt %) | Peel Adhesion (N/inch) |
| --- | --- | --- | --- | --- | --- |
| Example 1 | 5.5 | 3:2 | A/B1 | 0.35 | 35.8 |
| Example 2 | 15 | 1:4 | A/B1 | 0.50 | 43.1 |
| Example 3 | 15 | 3:2 | A/B1 | 0.50 | 33.4 |
| Example 4 | 15 | 1:1 | A/B1 | 0.30 | 34.7 |
| Example 5 | 25 | 3:2 | A/B1 | 0.50 | 23.8 |
| Example 6 | 35 | 2:3 | A/B1 | 0.50 | 24.6 |
| Example 7 | 35 | 1:1 | A/B1 | 0.70 | 15.3 |
| Example 8 | 35 | 3:2 | A/B1 | 0.50 | 15.0 |
| Example 9 | 45 | 1:1 | A/B1 | 0.50 | 12.1 |
| Example 10 | 25 | 1:4 | A/B1 | 2.00 | 10.4 |
| Example 11 | 25 | 1:4 | A/B1 | 3.50 | 6.6 |
| Example 12 | 5.5 | 3:2 | A/B2 | 0.70 | 27.6 |
| Example 13 | 15 | 1:4 | A/B2 | 0.50 | 44.1 |
| Example 14 | 35 | 1:1 | A/B2 | 0.70 | 9.5 |
| Example 15 | 25 | 1:1 | A/B1 | 1.50 | 13.4 |
| Example 16 | 25 | 1:1 | A/B1 | 2.00 | 11.1 |
| Comparative A | 0 | — | — | 0.35 | 39.3 |
| Comparative B | 0 | — | — | 1.50 | 15.7 |
| Comparative C | 15 | (1 filler) | A | 0.30 | 21.8 |
| Comparative D | 35 | (1 filler) | A | 0.50 | 9.5 |
| Comparative E | 15 | (1 filler) | B1 | 0.50 | 27.3 |
| Comparative F | 25 | (1 filler) | B1 | 0.50 | 18.8 |
| Comparative G | 35 | (1 filler) | B1 | 0.70 | 8.5 |
| Comparative H | 25 | (1 filler) | B1 | 2.00 | 10.6 |
| Comparative I | 25 | (1 filler) | B1 | 3.50 | 6.6 |
| Comparative J | 15 | (1 filler) | B2 | 0.50 | 26.3 |
| Comparative K | 25 | (1 filler) | A | 3.50 | 4.5 |

The results in Table 1 show that, as expected, the peel adhesion of the adhesive compositions generally decreases as the filler concentrations of the compositions increase. In particular, this drop in adhesion strength is most pronounced for Comparative Examples A, C and D, which include increasing concentrations of pure Filler A, and for Comparative Examples A, E, F, and G, which include increasing concentrations of pure Filler B1, with Comparative Example A being the reference without any fillers. Notably, the peel a filler mixture over a single one in Comparative H at this crosslinker concentration, whereas compared to Example 10, having a different ratio than Example 16, the adhesion is similar to Comparative H. Additionally, for adhesives with crosslinker concentrations between 2.0% and 3.5%, any improved adhesion may also depend on at least one of filler concentration, the filler ratio, and the filler type. For example, Example 16 and Comparative H may have similar peel adhesion even though they contain different fillers, but Example 10 may differ in peel adhesion due to a different filler ratio. In another example, Example 11 and Comparative I may have similar peel adhesion results, but these lower adhesion results may be due to increased crosslinker concentrations. In yet another example, Examples 6 and 8 may provide different peel adhesion results due to the different filler ratio. While all of these exemplary compositions exhibit good adhesive performance, the advantage provided by the combination of two fillers is most significant at higher filler levels. In particular, each of the Examples having filler concentrations above 15 wt % (Examples 5, 6, 7, 8 and 9) have a much higher peel adhesion than each of the Comparative Examples (Comparative Examples D, F, and G) with identical total filler concentration. More remarkably, even at filler concentrations as high as 45% (Example 9) the peel adhesion is still higher than in Comparative D and G which have only 35% of filler of either type. Even more remarkably, when comparing Examples 2 and 13 to Comparative A, it is possible to achieve higher peel adhesion than the adhesive without any fillers. In some embodiments, higher peel adhesion may occur when filler and crosslinker amounts are similar. Together, these results demonstrate that the provided adhesive compositions provide strong adhesive performance in combination with high filler concentrations. Further, in many embodiments, the total filler concentration may have improved peel adhesion over compositions containing only one filler (see Examples and Comparative Examples in Table 1).

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

We claim:

1. An adhesive composition comprising:
   an acrylic copolymer comprising a first block and a second block, wherein each of the first block and the second block independently comprises a crosslinkable functional group, and wherein the acrylic copolymer has a controlled architecture polymer (CAP) network;
   a crosslinker reactive with the crosslinkable functional groups; and
   two fillers consisting of a first filler and a second filler, wherein a ratio of an average characteristic particle dimension of the first filler and the second filler is in the range of 1 to 6, wherein the first filler is a liquid at a temperature greater than −40° C. and the first filler is a phosphorous-based material; and
   wherein the second filler is a solid at a temperature less than 50° C. and the second filler is a metal hydroxide or silica.

2. The adhesive composition of claim 1, wherein the concentration of the crosslinker in the adhesive composition ranges from 0.01 wt % to 2.0 wt %.

3. The adhesive composition of claim 1, wherein the combined concentration of the two fillers in the adhesive composition is less than 50 wt %.

4. The adhesive composition of claim 1, wherein the mass ratio of the first filler to the second filler ranges from 1 to 99.

5. The adhesive composition of claim 1, having a peel adhesion greater than 15 N/inch.

6. The adhesive composition of claim 1, wherein at least one of the two fillers is not halogenated.

7. The adhesive composition of claim 1, wherein at least one of the two fillers has particles having an average characteristic particle dimension that is greater than 20 nm.

8. The adhesive composition of claim 1, wherein at least one of the two fillers has particles having an average characteristic particle dimension ranging from 0.2 μm to 30 μm.

9. The adhesive composition of claim 1, wherein the acrylic copolymer does not comprise phosphorus or nitrogen.

10. The adhesive composition of claim 1, further comprising: a resin.

11. A method of preparing an adhesive composition, the method comprising:
    providing the adhesive composition of claim 1 wherein the acrylic copolymer has a controlled architecture polymer network.

12. A tape comprising:
    at least one adhesive layer comprising the adhesive composition of claim 1.

13. The tape of claim 12, wherein the at least one adhesive layers independently has a thickness ranging from 10 μm to 300 μm.

14. The tape of claim 12, further comprising:
    a backing layer joined to one of the at least one adhesive layers.

15. The tape of claim 14, wherein the backing layer has a thickness ranging from 5 μm to 10 mm.

16. The tape of claim 14, wherein the backing layer comprises polyethylene terephthalate.

17. The tape of claim 14, wherein the backing layer is a selected from the group consisting of a siliconized release liner and a carrier layer.

18. The tape of claim 17, wherein the carrier layer comprises one or more materials selected from the group consisting of low density polyethylene, high density polyethylene, polypropylene, polytetrafluoroethylene, polyether ether ketone, polyimide, polyamide, and a combination thereof.

19. The tape of claim 17, wherein the carrier layer comprises a scrim.

20. The tape of claim 17, wherein the carrier layer comprises a metal, plastic, or fabric.

21. A method of applying a tape to a surface, the method comprising:
    providing a surface having an outer face;
    providing the tape of claim 12; and
    adhering the adhesive layer of the tape to the outer face of the surface, thereby applying the tape to the surface.

22. A taped surface comprising:
    a surface having an outer face; and
    the tape of claim 12 adhered to the outer face of the surface.

* * * * *